United States Patent Office 3,287,401
Patented Nov. 22, 1966

3,287,401
PREPARATION OF ESTERS FROM ALDEHYDES WITH A MOLYBDENUM COMPOUND AS CATALYST
Lloyd Albert Pine and Henry George Ellert, Baton Rouge, La., assignors to Esso Research and Engineering Company, a corporation of Delaware
No Drawing. Filed Feb. 14, 1964, Ser. No. 344,836
8 Claims. (Cl. 260—494)

This invention relates to a process for the direct production of esters from aldehydes. More particularly, this invention relates to a process for forming esters by the condensation of an alpha-substituted aliphatic aldehyde, preferably with an alcohol.

Heretofore, it has been known to the prior art that condensation products such al alcohols, esters, and other derivatives of higher molecular weight can be produced from aldehydes by catalytic treatment. For example, Claisen, Ber., 20, 6 and 9 (1887), in studying the Cannizzaro reaction, found that the use of sodium alkoxides with benzaldehyde gave benzyl benzoate. Tishchenko J. Russ. Phys. Chem. Soc., 38, 355 (1906) then showed that aluminum alkoxide gave better results, and was operative with aliphatic aldehydes as well as with aromatic aldehydes. However, all Tishchenko reactions have had two essential requirements: (1) the use of a metal alkoxide as a catalyst, usually in rather large amounts, and (2) the absence of water, as any water immediately destroys the catalyst and stops the reaction. Both R. C. Fuson, "Advanced Organic Chemistry," John Wiley and Sons, New York, 1950, p. 359, and E. E. Royals, "Advanced Organic Chemistry," Prentice-Hall, Inc., New York, 1954, p. 723, point out in their books that the Tishchenko reaction is not widely applied as the catalyst is easily poisoned and soon loses its activity. Thus, in order to insure operability, the catalyst employed must be prepared from dry acid-free alcohol and the aldehyde feed must also be dry and free of acid. Unless these precautions are observed the aluminum alkoxide is decomposed and cannot be recycled for reuse. It naturally follows therefore, that the necessity to observe the above precautions has made the Tishchenko reaction, as it is known, commercially unattractive.

It is an object of the present invention, therefore, to provide a process for the direct formation of esters from alpha-substituted aliphatic aldehydes. It is another object to provide a process which employs a catalyst system which is stable in the reaction conditions employed and thus offers a solution to the problems heretofore encountered with regard to the prior art catalysts. It is still a further object to provide an improved, commercially feasible process for the production of esters wherein said esters are produced in good conversions and selectivities. Other objects will appear hereinafter.

The objects of this invention are accomplished by the following process of preparing esters which comprises contacting an alpha-substituted aliphatic aldehyde, preferably with an alcohol, in the presence of a molybdenum-containing catalyst, with said reaction most preferably being effected in the liquid phase. Accordingly, it has now been found that certain molybdenum catalysts selectively catalyze the reaction of aldehydes, preferably with alcohols, to form esters corresponding to said aldehydes and said alcohols in number of carbon atoms and configuration of carbon chains and substituent groups.

Broadly, the esters produced by the process of this invention are of the general formula:

$$RCH_2C(R')(R')CO_2CH_2R$$

wherein R is a hydrogen atom or an alkyl group, e.g. an alkyl group containing 1 to about 11 carbon atoms and R' is a hydrogen atom or a lower alkyl group, e.g. an alkyl group containing 1 to 2 carbon atoms with the proviso that at least one R' is a lower alkyl group. In this process such esters are obtained by the molecular condensation of an alpha-alkyl substituted aliphatic aldehyde having from 4 to about 15 carbon atoms with an aliphatic monohydroxy alcohol having 1 to about 12 carbon atoms in the presence of the above-mentioned molybdenum-containing catalyst. Preferably, however, the esters produced by the process of this invention are of the general formula:

$$RCH_2C(R')(R')CO_2CH_2C(R')(R')CH_2R$$

wherein, as above, R is hydrogen or an alkyl group and R' is a hydrogen atom or a lower alkyl group with the proviso that at least one R' is a lower alkyl group. In this preferment, the esters are obtained by the dimolecular condensation of an alpha-substituted aliphatic aldehyde of 4 to 12 carbon atoms having at least one lower alkyl group substituted in the alpha carbon atom thereof and preferably by the molecular condensation of such an alpha-substituted aliphatic aldehyde of 4 to 12 carbon atoms with an aliphatic monohydroxy alcohol of 4 to 12 carbon atoms and of the same number of carbon atoms and configuration of carbon chains and substituent groups as said aldehyde. Here too, the condensation reaction is effected in the presence of the molybdenum-containing catalyst. This preferred condensation reaction is noteworthy inasmuch as the alcohol employed therein is not consumed during said reaction. This phenomena is illustrated in the examples which are hereinlater presented.

In general, the aldehyde feed suitable for the process of this invention can be any alpha-substituted aliphatic aldehyde of from 4 to about 15 carbon atoms having at least one lower alkyl group substituted on the alpha carbon atom thereof. Non-limiting examples of such aldehydes include 2-methylpropionaldehyde, 2-methylbutyraldehyde, 2,2-dimethylbutyraldehyde, 2-methylhexaldehyde, 2-methylcaproaldehyde, 2-methylnonaldehyde, and the like.

The organic alcohol which is suitably reacted with the above aldehyde reactants in accordance with this invention include the primary, secondary, and tertiary aliphatic monohydroxyl alcohols of from 1 to about 12 carbon atoms. While secondary and tertiary alcohols are operable in the process of the invention, they are found to be less desirable than the primary alcohols and much less desirable than the aliphatic monohydroxy alcohols of 4 to 12 carbon atoms and which are of the same carbon structure as the aldehyde.

Non-limiting examples of suitable alcohols include methyl and ethyl alcohol, the linear and branched propyl-, butyl-, amyl-, hexyl-, heptyl-, octyl-, nonyl and the like. The preferred alcohols include the alpha-monosubstituted aliphatic monohydroxyl acids such as, for example, 2-methylpropyl alcohol, 2-methylbutyl alcohol, 2,2-dimethylbutyl alcohol, and 2 methylhexyl alcohol, and the like.

As hereinbefore mentioned, the ester product resulting from the reaction of this invention compares in carbon structure with the aldehyde employed. It is also found, and is hereinlater illustrated in the accompanying examples, that the presence of an alcohol is preferred so as to obtain good conversions. Further, the best selectivity is found to occur if the alcohol is of the same carbon structure as the aldehyde. Inasmuch as the reaction herein is limited to the branched aldehydes set forth above which do not easily aldolize, the alcohols employed are preferably also of the same branched carbon structure as the aldehyde. The following schedule, therefore, illustrates the ester product resulting from the reaction of branched aldehydes with branched alcohols.

| Aldehyde Reactant | Alcohol Reactant | Ester Product |
| --- | --- | --- |
| Iso-butyraldehyde | Iso-butyl alcohol | Iso-butyl-iso-butyrate. |
| 2-methylbutyraldehyde. | 2-methylbutyl alcohol. | 2-methylbutyl-2-methylbutyrate. |
| 2-methylhexaldehyde. | 2-methylhexyl alcohol. | 2-methylhexyl-2-methylhexanoate. |

In accordance with the present invention, a catalyst is provided which is more effective than catalysts heretofore known for the direct formation of esters from aldehydes or aldehydes and alcohols. The catalyst employed in the practice of the present invention is suitably a molybdenum-containing catalyst such as molybdenum sulfide ($MoS_2$). Other molybdenum-containing catalysts which may be employed include by way of example, molybdenum oxide, sulfided cobalt molybdate, molybdenum blue ($MoO_3$) and the like. These catalysts are truly selective in that the above objects relative to direct ester formation are accomplished. Furthermore, the molybdenum-containing catalysts used in the process of the instant invention are extremely stable and can be used for protracted periods without apparent loss of activity. This property is in contrast to the prior art catalysts which are, as hereinbefore mentioned, not stable under the conditions found in the present process and therefore rapidly lose activity with use. Illustrative of this are the foregoing aluminum alkoxide catalysts which are found to be particularly unstable in the presence of any water or acids.

The catalysts used in the present invention may, of course, be supported on inert carriers of any of the readily available types. Thus, examples of carrier materials which may be used as solid support components of the catalysts are the various aluminous and siliceous materials of natural or synthetic origin such as bauxite, aluminum oxide, activated alumina, Kieselguhr, magnesium oxide, magnesium silicate, magnesium carbonate, barium sulphate, pumice, kaolin, activated carbon, clays, carborundum, alundum, and the like. The non-acidic or weakly acidic carriers are preferred. The catalysts preferably contain 2–25 wt. percent of the active material supported on a carrier of the type above described, e.g., activated carbon. A preferred molybdenum-containing catalyst is molybdenum sulfide having the following general composition: 5–15 wt. percent, preferably 8–10 wt. percent, e.g., 9 wt. percent molybdenum oxide on a carrier of the type above described, e.g., activated carbon, sulfided to saturation with $H_2S$.

The reaction conditions employed in the process, whether said process is a batch or continuous operation, are as follows:

Temperature, 200 to 600° F., preferably 300 to 500° F., for example, 400° F.

Holding times, 0.2 to 10 hours, preferably 1 to 4 hours, for example, 2 hours.

While elevated pressures are not critically necessary for this process, sufficient pressure, e.g., 50 to 500 p.s.i.g., is usually employed so as to retain at least a portion of the reactants in the liquid phase. The amount of catalyst utilized is from 10 to 100 weight percent, preferably 40 to 60 weight percent, for example, 50 weight percent, based on the total reactants, i.e., aldehyde plus alcohol supplied. If a continuous esterification operation is employed, feed rates of reactants over catalyst of 0.1 w./hr./w. to 3.0 w./hr./w. are utilized. The aldehydes and alcohols are preferably employed in substantially equimolar amounts; however, the presence of large molar excesses of one of the reactants is found to have no deleterious effects. It is to be noted here that while the present process may be carried out in the presence of small amounts of hydrogen, it is preferred that the process is carried out substantially in the absence of hydrogen.

The esters produced by the present invention are highly desirable and, in general, are suitable for use in the manufacture or synthesis of detergents, of emulsifying or settling agents, solvents, lubricants, drying compositions, and the like.

Specific applications of the process of the present invention are further illustrated by the examples which follow.

EXAMPLE I

In order to illustrate a batch reaction of an alcohol and an aldehyde, the ester of isobutyl alcohol and isobutyraldehyde was produced. In this experiment, 500 ml. of isobutyl alcohol, 300 ml. isobutylraldehyde, and 300 ml. of pilled 10% molybdenum sulfide on activated carbon catlyst were charged to a 2-liter autoclave. The catalyst was stored prior to use in isopropanol and thus the pores of same were saturated with alcohol prior to the start of the reaction. The reactants were then heated for 6.5 hours at 350–400° F. under their own vapor pressure. It was found that 81% of the aldehyde had been converted in 87% selectivity to isobutyl isobutyrate. No isobutyl alcohol was consumed. The major by-products were isobutyric acid and the $C_{12}$ acetal. The isobutyl-isobutyrate was separated by distillation and identified by boiling point, its infrared spectra, and saponification to isobutanol and isobutyric acid.

EXAMPLE II

This example illustrates formation of the ester without the use of an alcohol reactant, but with the use of a catalyst which contained residual isopropanol similar to the catalyst employed in Example I. In this experiment 500 ml. of isobutyraldehyde and 300 ml. of molybdenum sulfide catalyst on activated carbon and containing residual isopropanol were heated in an autoclave for 6 hours at 350–400° F. as in Example I. The product analyzed by GC as follows:

|  | Area percent |
| --- | --- |
| Isobutyraldehyde | 41.2 |
| Isobutyl isobutyrate | 26.3 |
| Isobutyl alcohol | 14.9 |
| Isobutyric acid | 17.5 |

EXAMPLE III

This example illustrates formation of the ester in the substantial absence of alcohol, i.e. an alcohol reactant and a catalyst containing residual alcohol. In this experiment, 400 ml. isobutyraldehyde and 200 ml. of molybdenum sulfide catalyst on activated carbon were charged to a rocking bomb and heated for 5 hours at 400° F. Conversion was quite low (~10%). The major products were isobutyl-isobutyrate, isobutanol, isobutryric acid. In this example, the molybdenum sulfide catalyst had been refluxed with benzene to azeotrope off any residual isopropanol present since this catalyst had been stored under isopropanol.

From a comparison of the conversions resulting in the above Examples I, II and III, it is apparent that the presence of some alcohol is necessary for good conversions and its use as a reactant is preferred in order to retain excellent conversions. In addition, best selectivity is found to occur if the alcohol is of the same carbon structure as the aldehyde. As heretofore mentioned, the reaction also is found to be limited to branched aldehydes that do not easily aldolize.

While the foregoing description and exemplary operations have served to illustrate specific applications and results, the invention is not limited thereto. Other modifications may appear to those skilled in the art without deviating from the spirit of the invention.

What is claimed is:

1. A process for producing esters which comprises contacting an alpha-lower alkyl substituted aliphatic aldehyde reactant having from 4 to 15 carbon atoms with 10 to 100 weight percent based on the reactant of a molybdenum catalyst selected from the group consisting of molybdenum sulfide, molybdenum oxide and sulfided cobalt molybdate at a temperature of from about 200° to 600° F., said process being carried out substantially in the absence of hydrogen.

2. The process in claim 1 in which the reactant and catalyst are contacted under pressures of from 50 to 500 p.s.i.g.

3. A process for producing esters which comprises contacting an alpha-lower alkyl substituted aliphatic aldehyde having 4 to 15 carbon atoms with an aliphatic monohydroxylic alcohol containing from 1 to 12 carbon atoms at a temperature of from about 200° to 600° F. in the presence of from about 10 to 100 weight percent of a molybdenum catalyst based on the total amount of aldehyde and alcohol employed, said molybdenum catalyst being selected from the group consisting of molybdenum sulfide, molybdenum oxide and sulfided cobalt molybdate.

4. A process as in claim 3 wherein the production of the ester is accomplished substantially in the liquid phase.

5. The process as in claim 3 in which the reaction is effected under pressures of from 50 to 500 p.s.i.g.

6. The process of claim 3 in which the catalyst is molybdenum sulfide.

7. The process of claim 3 wherein the catalyst is molybdenum oxide.

8. The process of claim 3 in which the catalyst is sulfided cobalt molybdate.

References Cited by the Examiner
UNITED STATES PATENTS

| | | | |
|---|---|---|---|
| 1,630,593 | 5/1927 | Young | 260—494 |
| 2,094,297 | 9/1937 | Joshua et al. | 260—494 |
| 2,874,167 | 2/1959 | Guest et al. | 260—468 |
| 3,081,344 | 3/1963 | Hagemeyer et al. | 260—494 |

LORRAINE A. WEINBERGER, *Primary Examiner.*

V. GARNER, *Assistant Examiner.*